United States Patent [19]  [11] 3,897,369
Bertus  [45] July 29, 1975

[54] CATALYST

[75] Inventor: Brent J. Bertus, Bartlesville, Okla.

[73] Assignee: Phillips Petroleum Company, Bartlesville, Okla.

[22] Filed: Dec. 3, 1973

[21] Appl. No.: 420,878

Related U.S. Application Data

[62] Division of Ser. No. 242,373, April 10, 1972, Pat. No. 3,810,954.

[52] U.S. Cl. .............................................. 252/469
[51] Int. Cl. ............................................ B01j 11/32
[58] Field of Search ................................... 252/469

[56] References Cited
UNITED STATES PATENTS
3,692,863  9/1972  Kmecak et al. ................. 260/683.3
3,786,000  1/1974  Ono et al. ......................... 252/469

FOREIGN PATENTS OR APPLICATIONS
915,590  1/1963  United Kingdom ............ 260/680 E

*Primary Examiner*—Paul M. Coughlan, Jr.

[57] ABSTRACT

Organic compounds, particularly hydrocarbons, are oxidatively dehydrogenated to more unsaturated compounds by contact, under reactions conditions, with air, steam and a calcined solid catalyst composition comprising tungsten, tin and at least one metal of the iron subgroup of Group VIII. In one embodiment, isopentene is converted to isoprene over a nickel/tungsten/tin/oxygen catalyst at a conversion of 36 percent and with a modivity (modified selectivity) of 72 percent.

4 Claims, No Drawings

CATALYST

This is a division of application Ser. No. 242,373, filed Apr. 10, 1972, U.S. Pat. No. 3,810,954.

The present invention relates to chemical processes. More particularly, the invention relates to catalytic processes for effecting the dehydrogenation of organic compounds, particularly hydrocarbon compounds.

A widely used conversion method in the chemical processing industry is the dehydrogenation of organic compounds to compounds containing a higher degree of unsaturation, and which might be less plentiful and therefore more valuable. A number of catalytic dehydrogenation processes have been developed which have attained some measure of commercial success. Some of these are oxidative dehydrogenation processes.

The ultimate, utopian dehydrogenation process has not yet been discovered. As a consequence, it is still a continuing goal of the chemical processing industry to find alternative catalytic dehydrogenation methods. Such alternative methods become valuable on occasion because they can, depending upon the specific circumstances, provide conveniences and economies that can make the difference in whether a specific chemical processing scheme is practical or not. For any given combination of starting feed material and desired product, it is desirable to have a large number of alternative catalyst systems to consider. From these a catalyst and process can be chosen which provide the most acceptable combination of results in terms of minimum side reactions, high conversion rates, high yields, and high selectivities to the desired product. Also important are catalysts which have a low susceptibility to deactivation, and which can be operated for long periods of time without regeneration and/or which can be readily regenerated to an activity approaching that of freshly prepared catalysts. Each of these process aspects can vary with a specific situation.

A number of oxidative dehydrogenation systems which include halogens or halogen-releasing compounds are known in the art. Most of these include solid inorganic contact masses which give improved results apparently by promoting the oxidation of halides, thereby regenerating elemental halogen which is the primary dehydrogenation agent. Such processes exhibit many disadvantages in regard to equipment corrosion and the expense of continuously feeding, recovering, and recycling the relatively expensive halogen materials. Halogen-free dehydrogenation systems remain the most desirable for use in dehydrogenation processes, particularly in oxidative dehydrogenation processes.

It is an object of this invention to provide a process for the dehydrogenation of organic compounds to compounds having a greater degree of unsaturation.

Another object of the invention is to provide a process for the dehydrogenation in the presence of oxygen of a hydrocarbon feedstock to more unsaturated compounds.

Another object of this invention is to provide a process for preparing isoprene.

Other objects, aspects, and advantages of the invention will become apparent to those skilled in the art upon consideration of the accompanying disclosure.

Broadly speaking, according to this invention, organic compound feedstocks can be converted directly to organic compounds having a greater degree of unsaturation by contact, under suitable reaction conditions, with a free oxygen-containing gas, steam and a calcined solid catalyst composition comprising tungsten, tin and at least one metal selected from the iron subgroup of Group VIII, of the periodic table. This subgroup includes iron, cobalt and nickel. These are frequently called the ferrous metals of Group VIII or, for convenience, merely the ferrous metals. The oxidative dehydrogenation process of the present invention is particularly applicable for the conversion of hydrocarbon feedstocks to more unsaturated hydrocarbon compounds.

The catalysts of the present invention are compositions which can be represented by the empirical formula $$MeW_xSn_yO_z,$$

wherein Me represents at least one ferrous metal. Thus, the catalysts comprise calcined mixtures containing at least one ferrous metal, tungsten, tin and combined oxygen. These are present in atomic ratios as indicated by the formula $$MeW_xSn_yO_z.$$

In the formula, Me is selected from the group consisting of the ferrous metals iron, cobalt, or nickel; $x$ and $y$ are numbers having a value in the range of 0.01 to 5, preferably in the range 0.1 to 1; and $z$ is a number determined by the proportions and by the valence requirements of the calcined Me, W and Sn members of the mixture, the value of $z$ being such as to provide an amount of oxygen necessary to satisfy any unsatisfied valences of Me, W and Sn. The elements combined in the catalyst are not necessarily in the elemental state but can be combined with each other and with sufficient oxygen to form one or more neutral compounds such as nickel oxide, cobalt tungstate, iron stannate, nickel oxide, iron oxide and the like and mixtures of these, depending upon the identity and the proportions of the elements present.

These catalysts can also be supported on, or diluted with, a conventional catalytic support material such as silica, alumina, boria, magnesia, titania, zirconia, and the like, and combinations thereof, as well as with other similar conventional support materials known in the art.

Presently preferred are unsupported compositions represented by $NiW_xSn_yO_z$ or $CoW_xSn_yO_z$. Particularly effective results can be obtained with $NiW_xSn_yO_z$ compositions. Such compositions wherein $x$ and $y$ are in the range of 0.01 to 5, contain from about 3 to about 75 weight percent nickel or cobalt, from about 0.2 to about 75 weight percent tungsten and from about 0.1 to about 72 weight percent tin, plus combined oxygen; compositions wherein the values of $x$ and $y$ are in the preferred range of 0.1 to 1 contain from about 13 to about 52 weight percent nickel or cobalt, from about 7.5 to about 57 weight percent tungsten and from about 4 to about 48 weight percent tin, plus combined oxygen calculated on the basis of NiO, $WO_3$ and $SnO_2$.

The catalysts of the present invention can be prepared by any suitable method. Conventional methods such as coprecipitation, impregnation, dry mixing, wet mixing, and combinations thereof, can be used. In general, any method can be used which will provide an intimately mixed and calcined composition containing the above-described elements in the above-described atomic proportion and preferably having a catalytic surface of at least 1 m²/g.

Substantially any ferrous metal or tungsten or tin compound can be employed in the preparation of these catalysts so long as none of the compounds are detrimental to the final oxidative dehydrogenation catalyst, and so long as essentially all of the elements from the compounds used, other than the ferrous metal, tungsten, tin or oxygen, are removed from the final catalyst either by a prior washing step or by volatilization such as during calcination. However, small amounts of some other elements involved in the preparation of a catalyst can be tolerated in the final catalytic composition. For example, if alkali metal or alkaline earth metal hydroxide are used in a procedure involving precipitation of ferrous metals, small residual amounts of such alkali or alkaline earth metals are not damaging to the final catalyst composition. Similarly, if nickel sulfate or a tin sulfate is employed in the preparation, small residual amounts of sulfur in the final catalyst can also be tolerated. Halogen residues, on the other hand, are generally considered undesirable and these should be minimized.

Generally, the preferred ferrous metal, tungsten, and tin compounds are either oxides of these elements or compounds which are convertible to the oxide on calcination. Some examples of these are ferric oxide, ferrous nitrate, nickel acetate, cobalt nitrate, ammonium metatungstate, stannic oxide, and the like, and mixtures thereof.

In one method of catalyst preparation, compounds of the desired metals can simply be mixed, in a finely divided state, in the presence of sufficient water to form a slurry or paste. The compunds need not necessarily be soluble in water. The slurry or paste is then dried, and calcined to form an intimate mixture of the ingredients. This calcined mixture can, if desired, be formed into pellets, tablets, or other suitable catalyst shapes using suitable forming methods.

In another alternative catalyst preparation method, solutions of suitable ferrous metal compounds and tungsten and tin compounds are coprecipitated from aqueous solutions by the addition of alkali metal or alkaline earth metal or ammonium hydroxides. The resulting precipitates are then filtered, washed, dried and calcined. In another modification, two or more of such metal compounds can be coprecipitated and the resulting precipitate, either in the wet gel stage or in the calcined state, can be impregnated with a solution of a compound of another catalyst ingredient.

Still another catalyst preparation method is to boil a solution containing soluble compounds of ferrous metals, tungsten and tin until sufficient water has been removed that the mixture becomes viscous or syrupy and can then be dried and calcined.

Regardless of the method used to prepare the catalyst and regardless of the specific sequence of steps used, the last stage of the preparation is generally activation by calcination in an oxygen-containing gas such as air, or air and steam, at a temperature in the range of 900° to about 1,800° F. for about 0.1 to about 24 hours, or until the catalyst is active for oxidative dehydrogenation.

The feedstocks which are applicable for the oxidative dehydrogenation process of the present invention comprise dehydrogenatable organic compounds having from about 2 to about 12 carbon atoms per molecule and at least one

grouping, that is, adjacent carbon atoms each being bonded to at least one hydrogen atom. Hydrocarbons have been found to be particularly suitable as feedstocks. Particularly applicable are acyclic paraffins and monoolefins, preferably having from 4 to about 12 carbon atoms. These can be branched or unbranched. Acyclic monoolefins having 4 to 12 carbon atoms are particularly responsive. Among the conversions which can be carried out are the conversion of butane to butenes and butadiene, the conversion of isopentane to isoamylenes and isoprene, the conversion of isoamylenes to isoprene, and the conversion of butenes to butadiene. The product mono- and diolefins such as these are useful as monomers which can be polymerized to moldable resins and elastomers.

Some examples of other feeds include ethane, propane, isobutane, pentane, hexane, 2-methylhexane, octane, dodecane, 2,4-dimethyloctane, 2-methylbutene-1, hexene-2, octene-1, 3-methylnonene-4, dodecene-1, and the like, including mixtures thereof.

The dehydrogenatable feedstocks can be oxidatively converted according to the process of the present invention under any suitable conditions. In general, these conditions comprise a temperature in the range of from about 800° to about 1,300°F., preferably in the range of from about 950° to about 1,200° F.; a convenient pressure such as from about 7 to about 250 psia; and a volumetric oxygen:hydrocarbon ratio of about 0.1:1 to about 4:1. The presence of added steam is generally beneficial and volumetric steam:hydrocarbon ratios of 0.1:1 to about 50:1 can be used. The hydrocarbon feed rate will generally be in the range of from about 50 to about 5,000 GHSV, volume of gas per hour per volume of catalyst. The fixed catalyst bed is the preferred mode of contact, but other modes such as fluidized bed can also be used.

The dehydrogenation process is ordinarily carried out by forming a mixture, preferably a preheated mixture, of the dehydrogenatable feed, the oxygen-containing gas, and the steam (if used), and passing this mixture over the catalyst at the desired temperature and pressure. The effluent from the reaction zone is subjected to any suitable preparation method, such as fractionation, to isolate and recover the desired products. Unconverted feeds or partially converted materials can be recycled.

The catalysts of the present invention can be utilized for long periods of time without regeneration. However, when regeneration does become necessary, this can be accomplished by merely cutting off the flow of dehydrogenatable feedstock and allowing the catalyst to be contacted with the oxygen and steam for sufficient period of time to restore activity to the catalyst.

Generally, at least trace amounts of oxygenated by-products are also formed in these reactions. For example, compounds such as furan, acetaldehyde, furfural, and acetic acid can be obtained. Some carbon oxides will be formed as well as some cracking products.

The following examples are illustrative of the invention.

EXAMPLE I

In this example, a Ni/W/Sn/O catalyst was prepared and tested for oxidative dehydrogenation of isopentenes to isoprene.

A 25 g quantity of NiO, 20 g of $H_2WO_4$, and 10 g of $SnO_2$ were intimately mixed in the particulate form and sufficient water was added to make a slurry. The slurry was dried at about 300° F. and the solids were then calcined at 1,200° F. for about 3 hours. After calcination, the solid was broken up and granules of about 8–40 mesh were used in subsequent tests. From the ingredients used, the proportions of the metals in the catalyst corresponded to the empirical formula $NiW_{0.24}Sn_{0.20}O_z$.

The above-prepared catalyst was charged into a tubular fixed bed reactor and contacted with a stream of isopentenes mixed with air and steam. The isopentene rate was 400 GHSV, the oxygen rate was 660 GHSV and the steam: isopentenes ratio was about 25:1. The contact was made at 1,050° F. and at atmospheric pressure. The reactor effluent was sampled after 12 hours onstream. Analysis of the sample by gas-liquid chromatography showed that the conversion of isopentenes was 36 percent and the modivity to isoprene was 72 percent (modivity is a modified selectivity based on the analysis of gas phase components of the effluent which include isoprene, unconverted isopentenes, cracked products, and carbon oxides).

EXAMPLE II

In this example, a Co/W/Sn/O catalyst and a Fe/W/Sn/O catalyst were prepared and tested for the oxidative dehydrogenation of butane to butenes and butadiene.

In a manner essentially identical to that of Example I, a catalyst was prepared from 25 g $Co_3O_4$, 20 g $H_2WO_4$ and 10 g of $SnO_2$. These ingredients were sufficient to provide, after mixing, drying, and calcining, a catalyst conforming to the empirical formula $CoW_{0.26}Sn_{0.21}O_z$.

In like manner, a catalyst was prepared from 25 g of $Fe_2O_3$, 20 g of $H_2WO_4$ and 10 g of $SnO_2$. The ingredients were sufficient to provide a catalyst conforming to the empirical formula $FeW_{0.25}Sn_{0.21}O_z$.

Each of these catalysts, in the form of 8–40 mesh granules, was charged into a fixed bed tubular reactor and contacted with a mixture of normal butane, steam and air. The contact was carried out at 900° F., at 1,050° F. and at atmospheric pressure. The normal butane rate was 50 GHSV, the oxygen rate was 55 GHSV and the steam:butane ratio was 10:1. After 1 hour onstream, the effluent was sampled and analyzed by gas-liquid chromatography. The results of the runs using each of these catalysts, including the catalyst of Example I, are shown in Table I below.

TABLE I

|  | Co/W/Sn/O Catalyst 900° F. | 1050° F. |
| --- | --- | --- |
| Conversion, % | 22.3 | 28.4 |
| Modivity, % | | |
| To Butenes + Butadiene | 27.3 | 34.7 |
| To Butadiene Only | 8.2 | 14.8 |
| Fe/W/Sn/O Catalyst | | |
| Conversion, % | 27.6 | 24.8 |
| Modivity, % | | |
| To Butenes + Butadiene | 0 | 5.5 |
| To Butadiene Only | 0 | 4.8 |
| Ni/W/Sn/O Catalyst | | |
| Conversion, % | 3.9 | 19.6 |
| Modivity, % | | |
| To Butenes + Butadiene | 31.3 | 32.0 |
| To Butadiene Only | 7.8 | 22 |

These data show that catalysts of the present invention are active for the oxidative dehydrogenation of butane to butenes and butadiene. Of these, the nickel and the cobalt appear most active and selective. The data indicate that the iron-containing catalyst requires more severe conditions for best results.

As will be apparent to those skilled in the art from the above discussion, various modifications can be made in my invention without departing from the spirit or scope thereof.

I claim:

1. A calcined solid oxidative dehydrogenation catalyst composition consisting of a metal selected from the group consisting of nickel and cobalt, in association with tungsten, tin and oxygen, characterized by the formulae

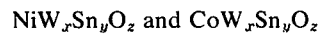

$NiW_xSn_yO_z$ and $CoW_xSn_yO_z$ respectively, wherein $x$ and $y$ are numbers having a value in the range of about 0.1 to about 1 and $z$ is a number determined by the valence requirements of said nickel or cobalt, said tungsten and said tin components.

2. A catalyst composition according to claim 1 wherein said metal is nickel.

3. A catalyst composition according to claim 2 having the empirical formula $NiW_{0.24}Sn_{0.20}O_z$.

4. A catalyst composition according to claim 1 wherein said metal is cobalt.

* * * * *